Figure 1:
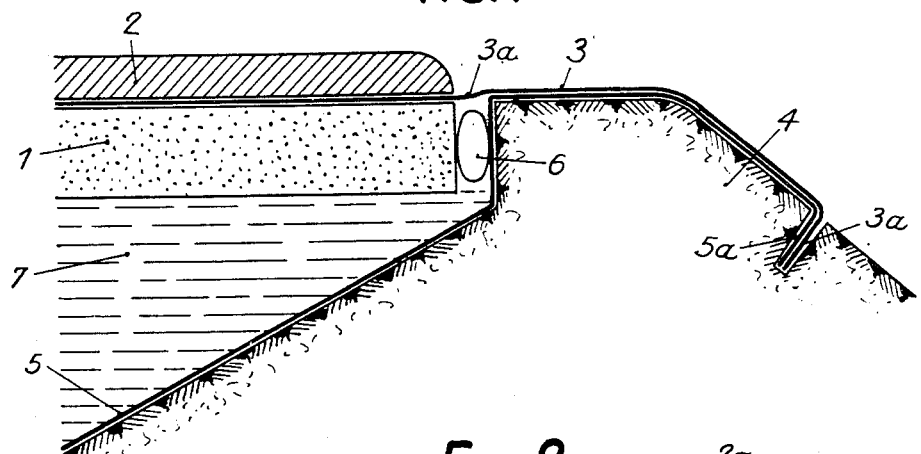

United States Patent [19]
Azalbert et al.

[11] 3,943,721
[45] Mar. 16, 1976

[54] RESERVOIR FOR STORING HYDROCARBON LIQUIDS AND PROCESS FOR FABRICATING THE SAME

[75] Inventors: Jean-Paul Azalbert, Ablon; Adrien Giraud, Neuilly; Claude J. Tassin, Courbevoie; Christian H. Pech, Chatou, all of France

[73] Assignee: Campagnie Francaise des Petroles, Societe Anonyme, Paris, France

[22] Filed: July 19, 1974

[21] Appl. No.: 489,974

[30] Foreign Application Priority Data
July 20, 1973 France .............................. 73.26767

[52] U.S. Cl. .................................................... 61/.5
[51] Int. Cl.² ............................................ B65G 5/00
[58] Field of Search ......... 61/.5, 1 R; 220/216, 217, 220/218, 232

[56] References Cited
UNITED STATES PATENTS

| 1,783,118 | 11/1930 | Griffin | 220/218 |
|---|---|---|---|
| 2,970,716 | 2/1961 | McCammon | 220/218 |
| 3,036,342 | 5/1962 | Fino | 220/218 X |
| 3,154,213 | 10/1964 | Ulm | 220/232 X |
| 3,205,665 | 9/1965 | Van Horn | 61/.5 |
| 3,330,118 | 7/1967 | Biais | 61/.5 |
| 3,462,040 | 8/1969 | Galloway | 220/218 |
| 3,493,143 | 3/1970 | Thompson et al. | 220/218 |
| 3,517,513 | 6/1970 | Renshaw et al. | 220/218 |
| 3,537,267 | 11/1970 | Webb | 61/1 R X |
| 3,592,009 | 7/1971 | Glijnis | 61/.5 |

*Primary Examiner*—Dennis L. Taylor
*Attorney, Agent, or Firm*—Sughrue, Rothwell, Mion & Zinn

[57] ABSTRACT

A reservoir for hydrocarbon liquids is formed by a hollow in the ground lined with a gas-tight sheet and covered by a roof floating on the liquid in the hollow, the roof comprising a non-metallic rigid body which is gas-tight and of low density, a meter cube of the body weighing between 15 kgs and 100 kgs, a layer of earth or the like covering the surface of the body, and auxilliary gas-tight means connecting the circumference of the roof body to the circumference of the hollow.

20 Claims, 12 Drawing Figures

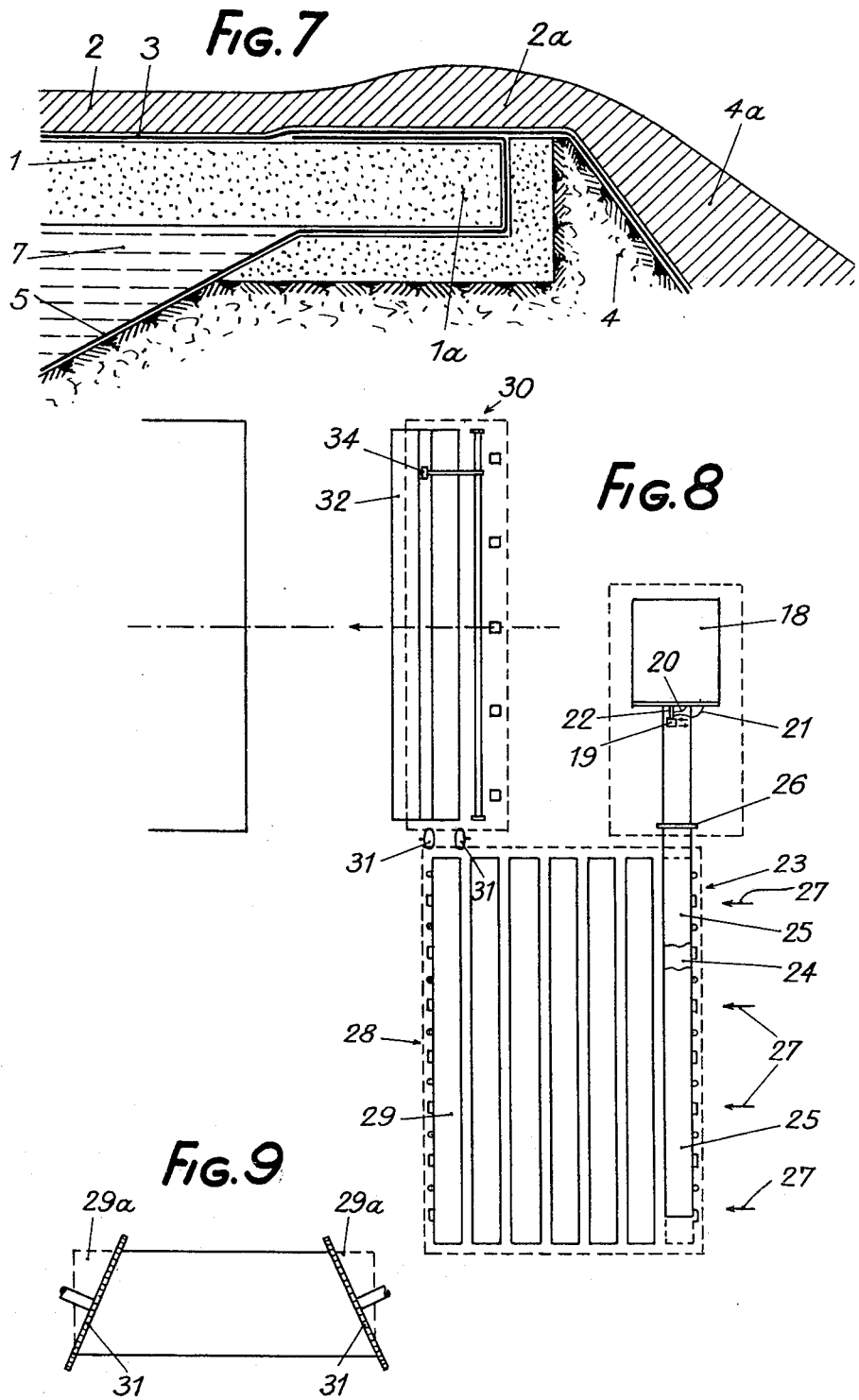

RESERVOIR FOR STORING HYDROCARBON LIQUIDS AND PROCESS FOR FABRICATING THE SAME

The invention concerns high-capacity reservoirs particularly for storage of hydrocarbons.

The problem of the resistance of the roof of such a reservoir to inclement weather has hitherto only partially been solved. Either the resistance is ensured by use of a metal roof, but the dimensions of the reservoir are then very much restricted, the cost of the construction increasing very rapidly with the width of the reservoir such that the costs become prohibitive, or resistance is ensured by a double roof, of which one portion, or lower cover, is in contact with the hydrocarbon being stored and has as its sole function to isolate the hydrocarbon from the external ambient atmosphere and the other portion, or upper cover, has as its sole function to protect the lower cover against the weather. As the upper cover cannot be metal, in order to enable protection of very large surfaces one then has recourse to an inflated cover the mechanical strength of which is obtained by the creation of an overpressure between it and the lower cover by means of a blower and by a large anchorage. In this way water running down is channelled outside the lower cover, which enables material of poor mechanical quality to be used for the lower cover, more especially because the wind does not act against it because of the protection of the inflated and anchored outer cover.

In every other case one is both constrained to reduce the dimensions of the reservoir and to employ complex means, such as floats distributed in a particular manner and connected together by cables upon which rests a cover, in order to enable means of drainage of water which collects in predetermined zones to remove the overload created by the water. Whatever these means, none of them enables a proper anchorage of the floating roof against the action of the wind which, in certain places, can exert a suction force of the order of 100 kg/m². Embankments which in general surround these roofs obviously cannot prevent the effects of the wind and consequent deterioration of the roof as soon as the latter is of a certain size. Further, even if a floating roof for a water reservoir could be easily imagined, which is formed only of a simple flexible cover resting on floats, such an arrangement would not be suitable for a reservoir for storage of hydrocarbons because it is necessary to ensure, besides the water-tightness of the floating roof, its perfect tightness to the gases. Hitherto a cheap solution to the problems presented by this kind for roof of large dimensions has not been found, the cost in general becoming very quickly prohibitive because of the obligation to ensure perfect gas-tightness which necessitates the employment of complex covers of thickness at least greater than 20 mm, as well as the presence of various means of supporting the considerable weight of a cover of this kind and of achieving a particularly strong anchorage, whilst avoiding collection of rainwater.

Even supposing these problems could be solved, one also comes up against the problem of the wind, as soon as the dimensions became large.

According to one aspect of the present invention, there is provided a reservoir for storage of liquid, such as a hydrocarbon liquid, comprising a hollow to be filled with liquid whose level is to be maintained substantially constant and a roof for floating on the stored liquid, wherein the roof comprises a non-metallic rigid body which is gas-tight and of low density, the weight of a meter cube of the body being between 15 kgs and 100 kgs, the body supporting a layer of earth or the like distributed over the whole of its surface, and auxiliary gas-tight means at least along the circumference of the roof and connected to the circumference of the reservoir for ensuring isolation of the stored liquid.

Use of a reservoir according to the invention can solve all the problems presented both by the largest dimensions selected, for example, of the order of 100 m wide by 1000 m long, and by the special nature of the products to be stored. In short, with a roof body which is rigid and of density sufficiently low and a thickness sufficient for supporting a layer of earth, it is found that the problems presented by weather are solved.

In short, with a rigid floating roof body, there may no longer exist, as in previous floating roofs, zones for collection of rainwater and it is no longer necessary to provide complex means for channelling or pumping off such water or to provide special structures for enabling the roof to deform under the load of the water. Further, because the roof itself is protected by a layer of earth, forming a considerable mass even for layers of earth of relatively small thicknesses, it can be sheltered from the direct effects of the wind, the depressions created by the wind being then low with respect to the weight of the earth. Not only is the total mass of the roof itself increased in this way, so increasing its stability, but the considerable extent of earth originally cleared during the banking can be reused and one can profit from this fact possibly to exploit this surface and recreate a natural environment, as the rainwater can be retained at least partially and beneficially by the covering earth as soon as the layer of earth has a thickness of, for example, some twenty centimeters.

Advantageously the material of the roof body is a polyurethane foam obtained by the conventional reaction of a polyhydric alcohol and an isocyanate in the presence of a catalyst and an expander agent, the polyhydric alcohol : polyether, polyester or mixture of polyether and polyester including free hydroxyl groups the OH index of which is higher than a value lying between 160 and 200.

The advantages resulting from such a material for the roof body are important because they not only enable a roof to be obtained which is of the consistent with required density and has perfect chemical resistance to hydrocarbons, but also enables the roof to be maufactured on the site of the reservoir.

It is found in short that if the OH index is higher than the foregoing values a rigid foam is obtained whose buoyancy is high enough to support the layer of earth since the density obtained can come down to values of the order of 25 to 30 kgs per meter cube and because of the relatively low cost of the foams obtained it is possible to have available a thickness sufficient to support a layer of earth such as increases the stability of the roof and its resistance to bad weather. It is likewise interesting to observe that the coefficient of thermal expansion of the material employed being very low the width of the roof can conveniently be adjusted to that of the reservoir. Further, the resistance to crushing and tension as well as its modulus of elasticity enable slight variations in level of the surface of the stored liquid as well as not inconsiderable local variations in load. The result is that a workman can easily move about on the roof and employ it as the support for a layer of earth covered with turf. On the other hand, because of the possibility of easily manufacturing polyurethane foams, this characteristic can be employed for repairing on the spot a roof damaged accidentally at any point.

According to another aspect of the invention there is provided a method of on site manufacture and laying in position of the roof body the above described reservoir, wherein the roof body is manufactured by joining up elements of prismatic shape of a length equal or substantially equal to the width of the hollow, these elements being orientated in the direction of width of the hollow and are successively connected together, the connection being carried out over the whole length of the elements, and the portion of the roof thus formed is slid progressively in the direction of the reservoir previously filled with water each time a new element is added to the portion of roof, so that the said formed portion floats on the water in the hollow during the joining of the last element to the next element.

Use of the above method can be particularly economical and convenient since polyurethane foams can be obtained by means of a simple mixer which it is sufficient to connect to an injection head of any kind, which is employed to expand the product over any suitable surface, the product increasing in volume of itself in predetermined proportion. It is therefore sufficient to locate the injection-machine in a suitable manner for the blocks obtained to be directed in a convenient direction and then to let them slide in order to produce and lay in place the floating roof so obtained.

Figure 10:
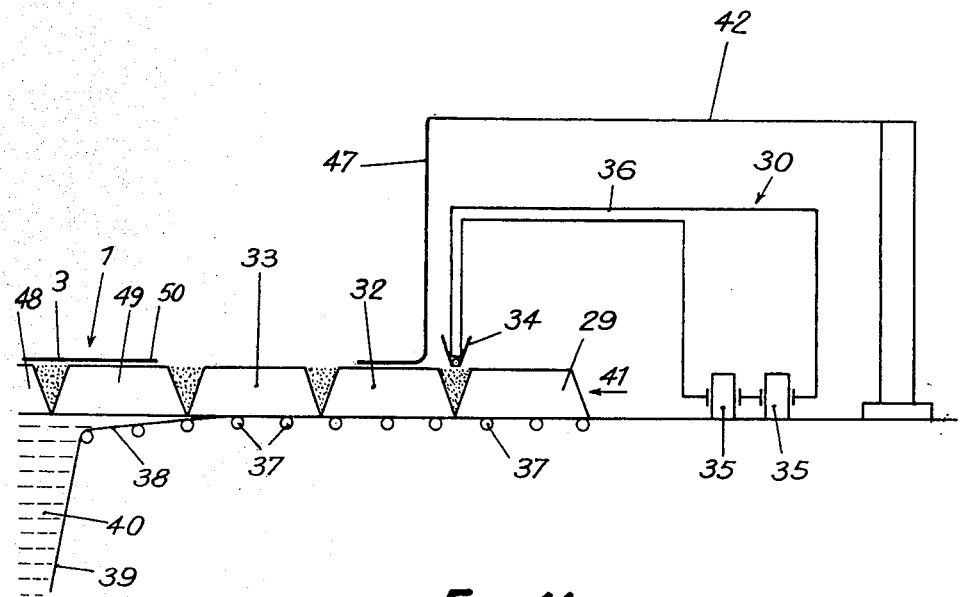
Figure 11:
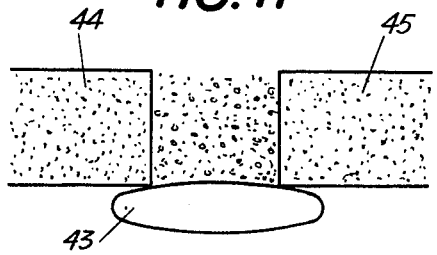
Figure 12:
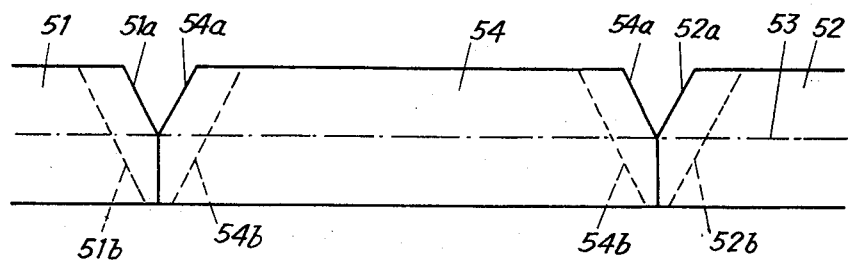

The present invention will be better understood from the following description of embodiments thereof given by way of example only, with reference to the accompanying drawings in which:

FIGS. 1 to 7 are diagrammatic views in section of portions of embodiments of reservoirs according to the invention, FIG. 8 is a diagrammatic plan view of apparatus for manufacturing the roof and laying it in position, FIG. 9 is a diagrammatic view of a part of the apparatus of FIG. 8, FIG. 10 is a diagrammatic view in profile of the station for connection of the elements of the roof, FIG. 11 is a detail in section illustrating the repair of a small portion of the roof, and FIG. 12 is a detail in section illustrating the repair of a larger portion of the roof.

FIGS. 1 to 7 illustrate embodiments of reservoirs in accordance with the invention, that is to say, each illustrates a reservoir of very large capacity having a rigid floating roof 1, the material of which may have a very low density, that is, the weight of a meter cube can lie between 15 and 100 kgs. The roof is covered with a layer 2 of earth or the like.

In the embodiment of FIG. 1, water-tightness is ensured at the circumference of the rigid roof 1 by a cover sheet 3 which may either extend over the whole roof 1 or solely round its circumference. By anchoring the edge 3a of the sheet 3 to the ground, gas-tight connection of the roof to the embankment 4 edging the reservoir is ensured. Inasmuch as the walls of the reservoir are lined with a sealing sheet 5, anchorage is effected preferably by welding together the edges 3a, 5a of the sheets 3 and 5, these sheets being in general heat-weldable. Welding can moreover be carried out at any other point along the portions of sheets above the embankment 4. A damper holster 6 either damps horizontal displacements of the roof 1 towards the embankment 4, these displacements being of small amplitude, or both damps and seals. It will be observed that only the sheet 3 need be gas-tight, the sheet 5 may simply be watertight.

When the damper bolster 6 only damps displacements of the roof towards the embankment a space may exist between the bolster 6 and the edge of the roof 1 and a not inconsiderable degassing of the stored hydrocarbon 7 may take place in the region. Preferably displacement of the roof of any magnitude is avoided by providing a damper bolster maintaining at its circumference permanent contact with the edge of the roof and with the edge of the reservoir. If the degassing is considerable, conventional means of exhaust (not shown) are provided.

Figure 2:
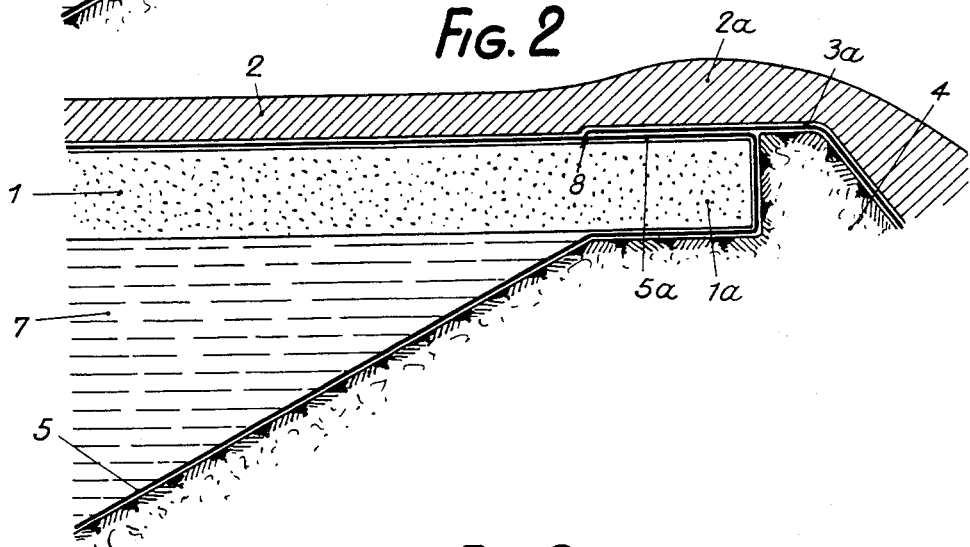

In the embodiment of FIG. 2, the rim 1a of the roof bears underneath and laterally against the embankment 4. In addition an extra amount of earth 2a above the portion 1a of the roof contributes to the anchoring of the roof and of the sheet 3. The latter is glued or welded at 8 to the roof 1 and to the edge 5a of the sheet 5 sealing the bottom of the reservoir. Because of the extra amount of earth 2a drains can be provided, located in this portion, to drain off rainwater, of which there is risk of collection at the surface of the layer 2.

Figure 3:
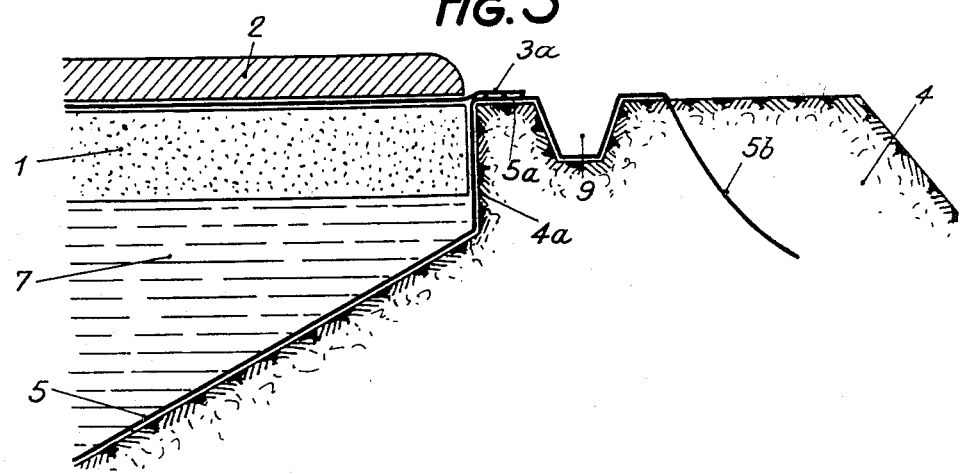

The roof 1 may alternatively, as shown in FIG. 3, be dimensioned in order to fit against the vertical wall 4a of the embankment covered by the sheet 5. Instead of gluing or welding the sheets 3, 5 to the roof, the portions 3a and 5a of the sheets 3, 5 can be welded on the embankment 4 and a water drain channel 9 can be lined with a portion 5b of the sheet 5 which is fixed into the embankment 4 simply by covering the edge portion of it with earth.

Figure 4:
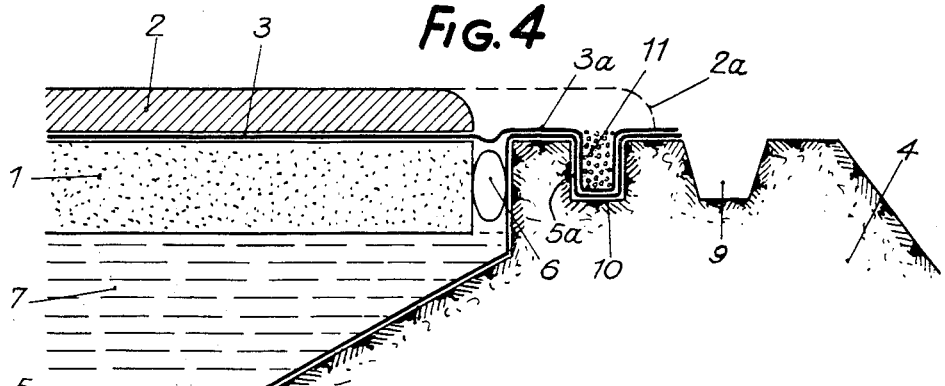
Figure 5:
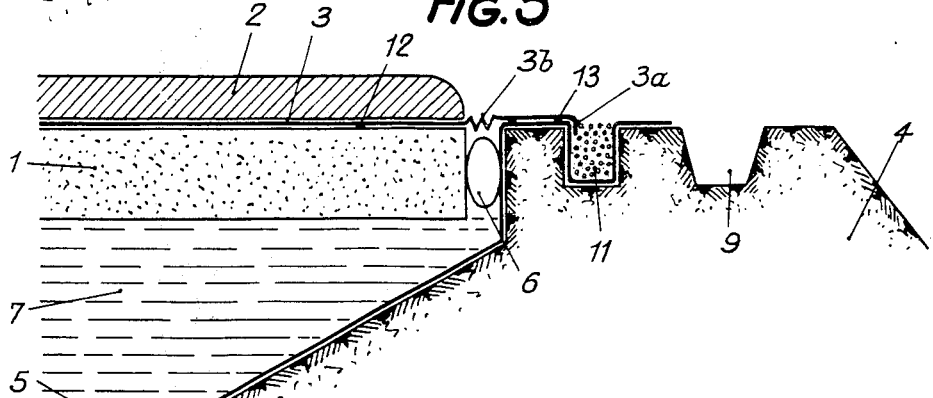
Figure 6:
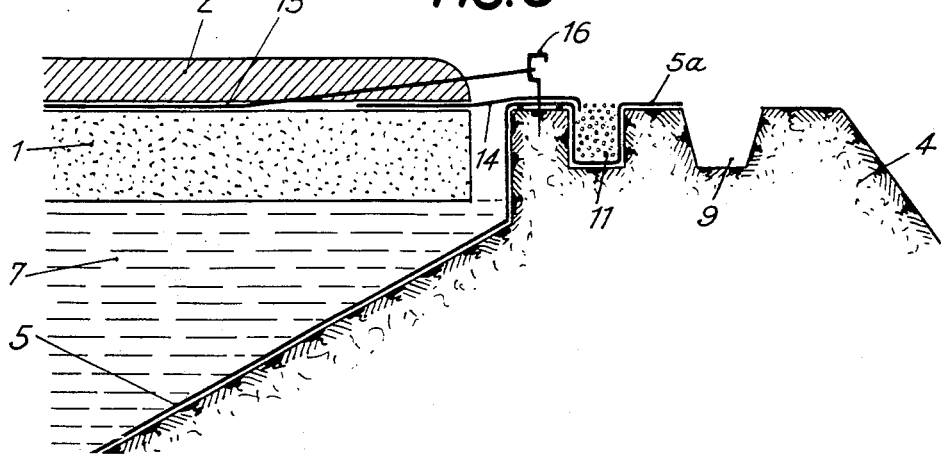

Anchoring of the sheets 3, 5 may be ensured, as shown in FIGS. 4 to 6, by a channel 10, the walls of which are lined by portions 3a, 5a of the sheets 3, 5 and which is filled in with cement 11. If the bolster 6 is maintained compressed because of the dimensions of the roof 1, a portion of the embankment 4 can also be covered by a layer of earth 2a. The run-off water is collected in the drain channel 9.

On the other hand, when the roof has too small a width for the bolster 6 to ensure a permanent seal, a length 3b of sheet 3 is provided, FIG. 5, which makes displacement of the roof 1 possible without exerting significant tension on the central or peripheral parts of the sheet. The sheet 3 may in fact stop at a point 12 where it is glued or welded to one edge of a simple strip or bellows, the other edge of which may either be anchored in the cement 11, or glued or welded at 13 to the portion of the sealing sheet 5. Perfect gas-tightness is thus ensured of the connection of the roof 1 to the edge of the reservoir since the rigid roof 1 is gas-tight and the strip serving as bellows, of which the edges 12 and 13 are respectively glued or welded to the roof 1 and the sheet 5, may be a complex strip of thickness sufficient to exhibit any required mechanical and physical properties.

It must be understood that the roof being gas-tight, the sheet 3 can be dispensed with from the moment if a gas-tight connection is provided between the roof and the edge of the reservoir.

In particular, as shown in FIG. 6, a strip of elastic material 14 is provided instead of the bellows and horizontal displacements of the roof 1 are prevented by a network of cables 15, these being anchored to means 16, such as stakes, hooks, etc. The elastic material 14 is glued to the roof 1 and the sheet 5.

In the embodiment of FIG. 7 a flexible block 17 of foam, for example of polyurethane, has been added to the inner edge of the embankment 4 and to the lower portion of the edge 1a of the roof underneath the sheet 5. In this way slight horizontal and vertical displacements of the roof are absorbed by the elasticity of the block 17 of foam.

It is unnecessary to repeat the advantages of the rigid non-metallic floating roof of low density, covered with a layer of earth or the like. It will however be recalled that when it is desired to use the invention for a reservoir of very large dimensions, for example, reservoirs having a width of the order of 50 to 200 m and a length of 500 to 2000 m, a polyurethane foam is employed which is obtained by the reaction of a polyhydric alcohol upon an isocyanate in the presence of an expander agent, a surfactant and a catalyst, the polyhydric alcohol: polyether, polyester or a mixture of these compounds including free hydroxyl groups the OH index of which is higher than a value of the order of 180 to 200.

It is found in short that polyurethanes prepared from polyhydric alcohol with an OH index higher than a value of the order of 180 to 200 exhibit high buoyancy, all the cells formed being in that case practically closed. The OH index can be verified as is known, by means of the mixture pyridine/phthalic anhydride which is made to react upon 0.8 to 1 gr. of a sample E of polyhydric alcohol per 25 cc of the mixture that is brought to the boil. It is rinsed with 15 cc of pyridine and titrated with NaOH in the presence of 10 drops of phenolphthalein to 1% in the pyridine. One receives thus $a$ cc of solution. The pyridine/phthalic anhydride mixture is titrated by dissolving 84.0 gr of pure phthalic anhydride in 600 cc of pure pyridine, taking 25 cc diluted by the same pyridine employed for the production of the reagent and adding to it 10 drops of phenolphthalein. Upon titrating with NaOH one obtains $b$ cc and the OH index is calculated at $$\frac{(b-a) \, 56.1}{E}$$

where E corresponds with the sample of polyhydric alcohol employed: 0.8 to 1 gr.

Experience has shown that rigid polyurethane foams obtained by means of polyhydric alcohols, the OH indices of which have values higher than 180 to 200, exhibit a compression strength higher than 1.5 kg/cm$^2$, a density which can be as low as 28 kg/m$^3$, can undergo a certain amount of bending, and show excellent resistance to hydrocarbons as well as excellent impermeability to gases. Furthermore, by reason of the very structure of the material the thermal conductivity is extremely low.

By way of example, the isocyanate may be dimethyl methane diisocyanate or prepolymers proceeding from a prereaction of an isocyanate on a polyhydric alcohol, the amount of isocyanate corresponding with the stoichiometric amount necessary for reacting with the hydroxyl functions of the polyhydric alcohol and possibly with the water of formulation without the amount of isocyanate being able to be less than 85% of this stoichiometric amount, the water being able to vary in the proportion of 0 to 3% of the weight of polyhydric alcohol.

The expander agent which must vaporize under the exothermic action of the reaction may, for example, be trichloro-fluoromethane alone or mixed with dichloro-fluoromethane, the foams obtained having lower densities with increasing proportions of expander agent. By way of example, amounts can be employed of the order of 30 to 50 parts of expander agent per 100 parts of polyhydric alcohol. If another expander agent is selected it is selected from products having a boiling point lying between −30° and +50°C. A gas can also be used which is formed in the course of the chemical reaction, such as carbon dioxide resulting from the reaction of water on an isocyanate.

The surfactant employed may be a silicone glycol polymer, diethylaminooleate, sodium salts of sulphonated ricinoleic acid, etc. in an amount greater than 0.3 parts per 100 parts by weight of polyhydric alcohol.

The catalyst may be any tertiary amine and especially triethylamine to which may be added complementary catalysts with tin salts: tin dibutyldilaurate, tin dibutyldiacetate, tin oleate, etc. The amounts employed are 0.5 to 3 parts per 100 parts by weight of polyhydric alcohol.

The interest in the product obtained arises not only because it has the mechanical and chemical characteristics required for the roof but also because it can be manufactured in a very simple fashion whilst enabling construction and laying of a roof of quite large dimensions with the aid of not very onerous means.

For this purpose a conventional machine 18, FIG. 8, is provided, supplying to an injection head 19 the polyhydric alcohol, water, catalyst and expander agent through a first pipe 20 and the isocyanate through a second pipe 21. The injection head 19 is carried by the arm 22 driven with a transverse reciprocatory motion above a conveyor 23. The latter carries a strip 24, which can be seen in the cutaway portion of foam block 25, made for example of paper or polyethylene, which in the course of its longitudinal displacement receives the mixture from the injection head 19, this mixture expanding naturally in the open air. Blocks 25 are thus obtained of the desired length; the width may be 1 to 1.5 m, for example. The height and the density correspond as has been seen, with the proportion of expander agent used. Thus a block 25 is entirely formed when it reaches the saw-station 26. A block 25 is guided laterally by vertical rollers, and strips of paper may be placed at the sides in order to facilitate driving and formation of the block.

Jacks 27 enable the blocks 25 so formed to be moved laterally so as to bring them in succession on to a second conveyor 28. The latter enables a block 29 lying opposite a welding unit 30 to be directed through a station for sawing the blocks, where inclined saws 31 transform the blocks of nearly rectangular section into blocks of trapezoidal section, as shown in FIG. 9 where the portions 29a cut from a block have been shown in dotted line. It is sufficient therefore to move the block 29 after sawing to a position adjacent a block 32, already welded to a preceding block 33 (FIG. 10), in order to proceed to weld the blocks 29 and 32 together. For this purpose a mixture of the constituents of the polyurethane foam is injected, by means of a welding head 34 fed by welding unit 30, between the inclined surfaces of adjacent blocks.

In view of the length of the blocks, the unit 30 is movable on guide rails 35 (FIG. 10), a gantry 36 being used to support the pipes for feeding the constituent products to head 34. In order to avoid loss of product during welding a small strip can be arranged at the bottom of the join between adjacent blocks.

The roof 1 thus formed is pushed by jacks 41 towards the excavation 39 of the reservoir after adding each new block. For this purpose the blocks rest on rollers 37, one portion of the rollers resting on an inclined surface 38 running along the side of the excavation 39. The excavation being filled with water 40, the roof 1 floats immediately.

When it is desired to protect the roof by a cover sheet 3 any method, continuous or discontinuous, of laying it in position may be employed. One may, for example, start by joining together a certain number of elements such as 48, 49, and then lay this portion of the cover sheet 3 in place, which can stop at 50, for example. Then manufacture of the roof 1 is continued by means of the elements 33, 32, 29, etc. and covering is recommenced with a new portion of the sheet 3 which is connected at 50 to the portion already laid in position. A protective cover sheet 47 hung on a frame 42 enables the welding head 34 to be thermally insulated to a certain extent.

After completion of the roof 1, welding or gluing of the sheets 3 and 5 proceeds, depending upon the method of connection employed.

Another advantage inherent in the method of manufacture employed is that in the event of accidental deterioration of a portion of the roof it is easy to carry out an efficient repair. In short, as the roof is sufficiently rigid to withstand extra loading a workman can walk over the roof to the place of the accident, clear away the damaged portion and enlarge the possible opening in order to facilitate repair.

If the opening is of small size, as illustrated in FIG. 11, some kind of inflatable plugging piece such as 43 is introduced through the opening lying between the roof blocks 44 and 45, inflation of the piece 43 proceeds, the liquid lying trapped in this opening above the bottom 43 is drawn off and the opening is filled up with polyurethane foam 46 which is formed by projection of the appropriate mixture on to the piece 43. If the opening is of larger size, as shown in FIG. 12, the upper portions of the edges of the blocks 51 and 52 are cut back along inclined planes 51a and 52a ending at the level 53 of the liquid, the edges becoming vertical again in the liquid. In the opening so formed a plug 54 of polyurethane is arranged, the edges of which have portions extending in an inclined plane 54a above the level 53 of the liquid. It is then sufficient to deposit a suitable mixture in the V-shaped spaces located above the level of the liquid and lying between the inclined planes 54a and 51a and 52a, to obtain an adequate joint.

A plug 54 can alternatively be provided, the edges of which lie in inclined planes 54b, blocks 51 and 52 ending in planes 51b and 52b so as to be able to introduce into the annular space thus achieved an inflatable ring which is inflated after introduction underneath the roof and the plug 54. After emptying out the liquid above the ring 55 one proceeds with filling of the annular portion lying between surfaces 54b and 51b and 54b and 52b with polyurethane foam which welds to the walls over the whole thickness of the blocks.

Repair is therefore extremely easy. If a cover sheet 3 is employed gluing or welding then proceeds of a suitable replacement strip which may be identical or not with the material of the cover sheet 3.

What is claimed is:

1. A reservoir for storage of liquid, such as a hydrocarbon liquid, comprising a hollow to be filled with liquid whose level is to be maintained substantially constant and a roof for floating on the stored liquid, wherein the roof comprises a non-metallic rigid body which is gastight and of low density, the weight of a meter cube of the body being between 15 kgs and 100 kgs, the body supporting a layer of earth and the like distributed over the whole of its surface and auxiliary gastight means at least along the circumference of the roof, and connected to the circumference of the reservoir for ensuring isolation of the stored liquid.

2. A reservoir as claimed in claim 1, in which the roof body is made of a polyurethane foam obtained by the reaction of a polyhydric alcohol and an isocyanate in the presence of a catalyst and an expander agent, the polyhydric alcohol: polyether, polyester or mixture of polyether and polyester including free hydroxyl groups the OH index of which is higher than a value of the order of 180 to 200.

3. A reservoir as claimed in claim 2, in which the amounts of polyhydric alcohol and isocyanate, are in stoichiometric proportion in order to react with the hydroxyl functions of the polyhydric alcohol and possibly the water of the formulation, the latter varying in the proportion of 0 to 3% of the weight of the polyhydric alcohol without the amount of isocyanate being less than 85% of this stoichiometric amount.

4. A reservoir as claimed in claim 3, in which the amount of the expander agent is 30 to 50 parts per 100 parts by weight of polyhydric alcohol, the boiling point temperature of the expander agent being between −30°C and 50°C and the amount of catalyst employed being 0.5 to 3 parts per 100 parts of polyhydric alcohol.

5. A reservoir as claimed in claim 2, in which the reaction is effected in the presence of a wetting agent of which the amount employed is greater than 0.3 parts per 100 parts by weight of polyhydric alcohol.

6. A reservoir as claimed in claim 1, in which the auxiliary gastight means include a gastight surface covering at least a portion of the roof and which is welded or glued to a sealing sheet covering the walls of the hollow.

7. A reservoir as claimed in claim 6, in which the sealing sheet is anchored to the ground together with the gastight surface, the gastight surface extending between an upper portion of the roof and the layer of earth or the like.

8. A reservoir as claimed in claim 6, in which the gastight surface is an elastic strip joining the periphery of the roof to the gastight sheet.

9. A reservoir as claimed in claim 1, in which a damper bolster is provided about the lateral circumferential surface of the roof body.

10. A reservoir as claimed in claim 9, in which the damper bolster forms a gastight joint between the circumferences of the roof body and the hollow.

11. A reservoir as claimed in claim 1, in which the circumferential portion of the roof body rests on an embankment, and is covered wth an extra thickness of earth or the like.

12. A reservoir as claimed in claim 11, in which the circumferential portion of the roof body rests on the embankment by means of a flexible cushion of polyurethane foam.

13. A reservoir as claimed in claim 12, in which the vertical circumferential surface of the roof body is adjacent a flexible vertical cushion of polyurethane foam.

14. A reservoir as claimed in claim 6, in which the vertical circumferential surface of the roof body is applied against a sheet for sealing the walls of the hollow.

15. A reservoir as claimed in claim 6, in which the roof body is anchored by cables to an embankment edging the hollow.

16. A method of on site manufacture and laying in position of the roof body of a reservoir for storage of liquid, such as a hydrocarbon liquid, comprising a hollow to be filled with liquid whose level is to be maintained substantially constant and the roof floating on the stored liquid, wherein the roof body is manufactured by joining up elements of prismatic shape of a length equal or substantially equal to the width of the hollow, said method comprising the steps of
 orienting the elements in the direction of the width of the hollow,
 positioning the elements side by side,
 successively connecting the elements together over the whole length of the elements by gluing or welding, and
 progressively sliding the portion of the roof body thus formed in the direction of the reservoir previously filled with water each time a new element is added to the portion of roof body, so that said formed portion floats on the water in the hollow during the joining of the last element to the next element.

17. A method as claimed in claim 16, in which the location in which the elements are connected is on the longitudinal axis of the hollow.

18. A method as claimed in claim 16, in which the transverse section of the elements is in the form of a trapezium and composed of a rigid polyurethane foam, material being applied in the triangular section space formed between the sidefaces of the two elements to be connected, the material being a rigid polyurethane foam which is produced at the time of the application.

19. A method as claimed in claim 18, further comprising the steps of forming each element by
 transverse sweeping of a head, for injection of products of formation of a rigid polyurethane foam, over a strip of sheet material moved by a conveyor, the said foam expanding on the sheet material strip between vertical rollers to form a continuous prismatic block,
 advancing the prismatic block to a first sawing station and cutting the block to produce elements of the required length,
 advancing each element towards a second sawing station and cutting each element in a direction parallel to its length to trapezoidal section, and
 bringing each element, during the course of the second cutting operation, to the station at which it is connected to the formed portion of the roof body.

20. A method as claimed in claim 19 further comprising the step of covering the completed roof body with a layer of earth.

* * * * *